United States Patent [19]

Kleiman

[11] Patent Number: 4,621,398
[45] Date of Patent: Nov. 11, 1986

[54] AUTOMATON TOOL MOUNTING SYSTEM

[75] Inventor: William J. Kleiman, Cedar Rapids, Iowa

[73] Assignee: Rockwell International Corporation, El Segundo, Calif.

[21] Appl. No.: 446,932

[22] Filed: Dec. 6, 1982

[51] Int. Cl.⁴ ............................................. B23Q 3/155
[52] U.S. Cl. ............................... 29/26 A; 339/16 RC; 901/50
[58] Field of Search ...................... 29/26 A, 27 C, 568; 279/89, 90, 91; 339/15, 16 R, 16 C, 16 CR; 901/42, 50

[56] References Cited

U.S. PATENT DOCUMENTS

| 4,054,975 | 10/1977 | Lundstrom | 29/27 C |
| 4,270,824 | 6/1981 | Erickson | 339/15 |
| 4,310,958 | 1/1982 | Balaud et al. | 29/26 A |

FOREIGN PATENT DOCUMENTS 0043153  1/1982  European Pat. Off. ......... 219/125.1

Primary Examiner—Z. R. Bilinsky
Attorney, Agent, or Firm—Robert C. Mayes; George A. Montanye; H. Fredrick Hamann

[57] ABSTRACT

Disclosed is a tool mounting device and system for utilizing same having a bayonet connector with integral electrical and pneumatic connections. The automaton is capable of engaging a desired tool on command, utilizing the tool, and then replacing that tool and obtaining a second tool without human interference. Electrical power is provided for certain tool accessories as is a pneumatic conduit for driving drills, sprayers, and the like.

15 Claims, 2 Drawing Figures

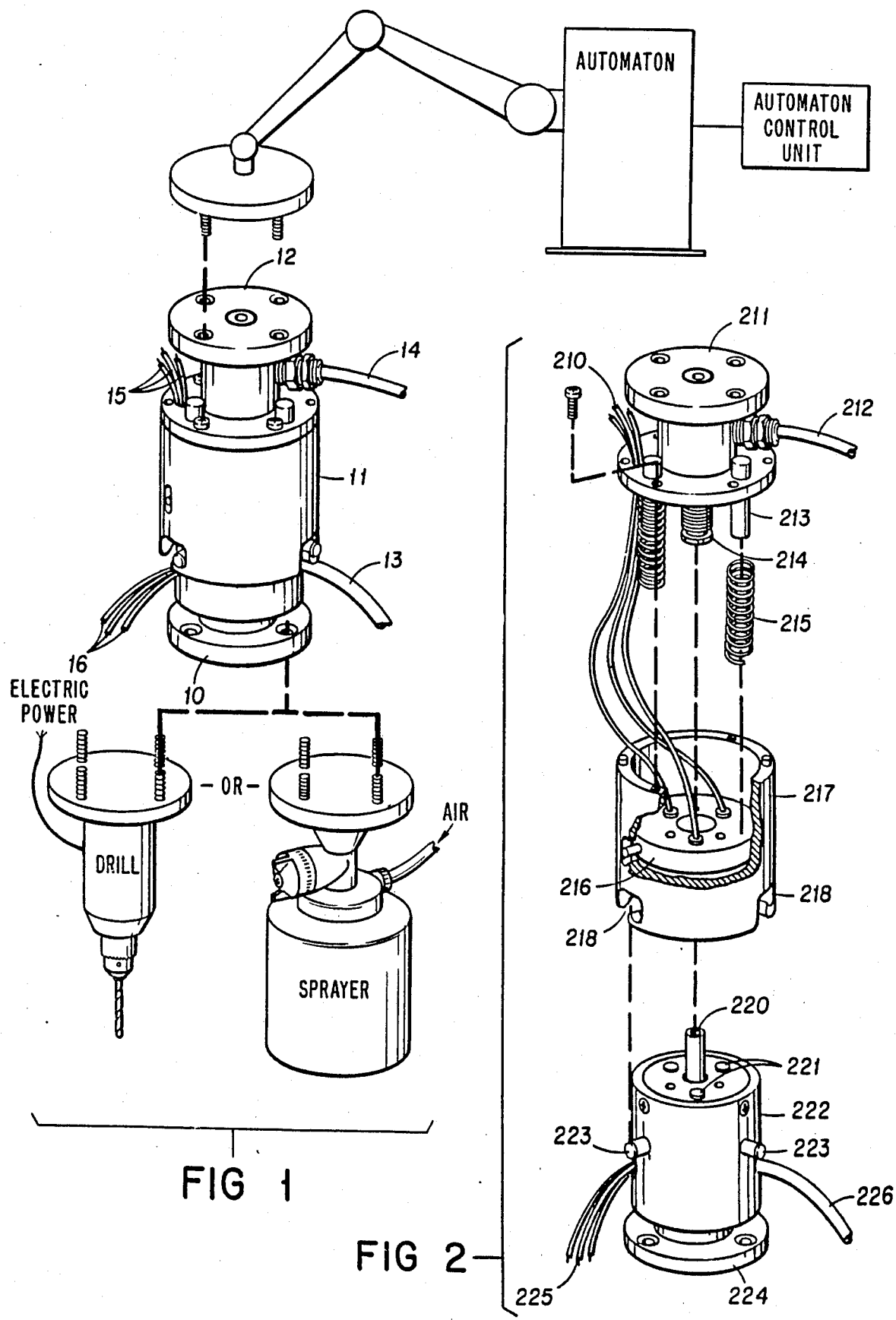

AUTOMATON TOOL MOUNTING SYSTEM

BACKGROUND OF THE INVENTION

This invention relates to automated assembly line machinery in general and in particular to automatons or industrial robots.

Recent developements in assembly line techniques have involved the increase in use of automatons or robots to provide a rapid and precisely repeatable worker on an assembly line which does not require meal breaks, suffer from fatigue, or become bored with excessively menial and boring tasks.

The use of a tool by an automaton generally will require that the tool be capable of manipulation by the automaton, i.e., the automaton can physically move the mass of the tool and can direct the working aspect of the tool to the proper place on a work piece.

An additional requirement is that the tool have the proper type of power, electrical for electric drills, sanders, routers, soldering tools and welders, as well as pneumatic power for air turbine driven tools such as drills and impact wrenches, as well as sprayers and other air powered accessories.

A problem encountered with this approach is the relative difficulty in interchanging between one tool for use on a work piece and a second tool for use on the same work piece, particularly on an assembly line configuration wherein the work piece is required to move past a robot only once on the production line. The time involved in changing tools as well as disconnecting the electric or pneumatic connection to the tools requires that two robots or more be utilized, each having its dedicated tool attached to the arm.

SUMMARY AND BRIEF DESCRIPTION OF THE DRAWNGS

Accordingly, it is an object of the present invention to provide an apparatus and a system for rapid connection of a variety of tools to a robot.

Another object of the present invention is to provide a tool mounting system capable of full automation wherein the automaton is programmed to select a tool as well as programmed to change that tool as required by the program instruction.

Briefly, in accordance with the present invention, a coupling apparatus for joining a tool to an automaton comprises a male connector having in cooperative combination at least one pin, a first plurality of electrical contacts, a first compressed air fitting, and a mounting surface; and a cooperating female connector having at least one slot for receiving the pin, a second plurality of electrical contacts for connection with the first plurality of contacts, a second compressed air fitting for connection to the first compressed air fitting, and a mounting surface. The mounting surfaces are for attaching one of the connectors to a tool and the cooperating connector to the moveable arm of an automaton.

The male or female member is rigidly attached to the arm and thereafter the cooperating connector is rigidly attached to the tool.

A plurality of tools is each attached to its own respective cooperating connector; in this manner a variety of tools may be quickly mounted and dismounted from the automaton.

Furthermore, if the cooperating connectors and the respective tools are each placed in known positions relative to the automaton, the program instructions within the automaton may command the arm to engage one of the connectors, utilize the attached tool, and thereafter return that connector and tool to its previously known position to disengage that connector. Subsequently, the cooperating member attached to the arm is freed to locate a second cooperating connector and its attached tool and to utilize that second tool.

FIG. 1 is a perspective view of the joined male and female members in accordance with the present invention.

FIG. 2 is an exploded perspective view of the female member in accordance with the present invention shown in relationship to the male member.

DETAILED DESCRIPTION OF THE INVENTION

Referring now to FIG. 1, the perspective view of a coupling apparatus in accordance with the present invention is shown. Mounting surface 10 and mounting surface 12 are provided for rigid fastening such as bolting to the arm of an automaton or industrial robot and for rigid mounting to the frame assembly of a working tool.

For purposes of description of the invention, the female portion 11 of the coupling apparatus is described as it would be connected to the arm of an automaton, and the male portion 10 is described as it would be connected to a tool; however, either the male or the female component may be mounted to the tool with the cooperating connector mounted on the automaton arm. Air supply 14 provides pneumatic power to the coupling and is controlled in one embodiment, by a solenoid in the automaton such that air pressure is applied at the proper times and the proper amounts in response to program instructions in the automaton. Electrical conductors 115 provide permanent electrical connection to the automaton and provide electrical power to the coupling apparatus. The shown embodiment has three electrical contacts, one for providing ground, a second contact for providing a +12 volt DC power and a third for providing a 120 volt AC power supply to the attached tool. The number of contacts in the connector is not limited to three, but may be expanded to a desired number to provide a wide variety of electrical power contacts to a tool and accordingly the appropriate contacts are engaged to the tool to provide the proper power such that when the automaton is programmed to pick up a 120 volt soldering iron, for example, the 12 volt contact on the automaton connector will not be engaged, thereby providing only 120 volts to that particular tool. An alternative method of providing the appropriate power to the tool is to have an electrically switchable power supply within the automaton control apparatus and the appropriate power supply is engaged by a relay in the automaton to present the appropriate voltage to the appropriate contact when the appropriate tool is attached. In a production environment, however, the reliability of the system is enhanced by maintaining an appropriate power supply at the connector at all times and merely connecting the cooperating connector to its tool to those contacts which will be required by that tool. This eliminates the need for complex power supply switching in the automaton.

Mounting surface 12 is rigidly attached or bolted to the arm of the automaton and the female component 11 of the bayonet coupling is shown having the male portion 10 fully seated and locked with the tool air conduit 13 for providing air to an attached tool and connectors 16 for providing power to a tool. In a preferred embodiment, one of the pins for locking the bayonet couplings together is larger in diameter than the other locking pins and thereby provides a positive orientation for the tool such that the coupling may only be joined in one way and thereby prevent disorientation of the electrical contact scheme. Alternative methods of positive orientation of bayonet couplings are known in the art, and are also useful.

Referring now to FIG. 2, an exploded view in perspective of the female member of the bayonet coupling is shown wherein the housing member 217 provides locking slots 218 for rigid engagement of male member 222 by lockiYg pins 223. Insulator 216 provides a rigid mounting for the electrical contacts to interface with contacts 221 on male member 222. The air coupling 214 has a check valve structure preventing air flow from air supply 212 unless the male member 220 is inserted into coupling 214. In this manner, should a tool not require air, by eliminating coupler 220 on the male member, the air supply becomes ineffective for that tool coupling. However, as that tool is disengaged and a second tool having coupling 220 is engaged, the air supply will be readily available to operate the second tool. Similarly, when the female member 217 is engaged with the male member, electrical contacts 221 make electrical contact from wires 210 to wires 225 to provide a continuous electrical path from the automaton to the then-mounted tool. Should the tool require significant current, such as a soldering iron, the contacts are designed to carry the required current load of the tool having the highest demand such that excessive heat buildup is avoided. The tools are mounted on surface 224 and the air supply connection 226 is connected to those tools having an air supply requirement. Should a tool be mounted such as an pneumatic drill, the pneumatic supply line 226 is connected to the tool and is readily controlled by an automaton solenoid apparatus. The solenoid apparatus, not shown, is mounted in one embodiment on the automaton and is programmed to supply air to the coupling and thereafter to the tool in response to the program instruction. In this manner, the program is capable of applying air to a tool such as a paint sprayer or drill after the tool has been mounted and properly positioned to operate on a workpiece. In this example, the wires 225 are not connected to the pneumatic drill, and the electrical contacts are not required. However, it can be seen that by disengaging the coupler attached to the pneumatic drill, the automaton arm is automatically prepared to receive a soldering tool attachment or other tool and connector assembly requiring either electricity, air supply, or both. This cooperative association of the mounting and supply structures enables the automaton on an assembly line to perform two diverse operations sequentially on the same work piece. The automaton may further be utilized in conjunction with the present invention to perform two distinct tasks with a minimum of change-over difficulty and thereby work pieces of a different nature may be processed at the same automaton work station, the automaton providing different functions to each of the work pieces. For example, a work piece may require a hole to be drilled and a second work piece immediately following may require a solvent spray. In the present example, the same automaton could provide both functions with a minimum of difficulty as the automaton is directed to disengage the drill and to engage the solvent sprayer, then to perform the solvent spraying function. The drill and solvent sprayer in the present example have a fixed and known position relative to the automaton where the automaton arm is directed by program instruction to place the connector attached to the arm directly on the connector attached to the respective tool and engage same by depressing and turning the arm. In this respect, the springs 215 in FIG. 2 must collectively have a depression resistance less than that which the automaton arm is capable of attaining. An additional constraint is the limitation of the pressure which the tool (such as a drill) can be used to apply to a work piece since the springs 215 could potentially be disengaged at too high a tool application pressure. Rotational problems, however, are prevented by a properly designed slot 218 such that the arm can be rotated without disengaging the respective connector.

A good example of a tool for an automaton which may readily adapt the present invention to good effect is disclosed in the patent application entitled "A Soldering Tool for an Automaton" by William J. Kleiman, U.S. patent application No. 6/447,041 filed Dec. 6, 1982. The disclosure of that application is incorporated herein by reference thereto.

While the present description of the invention is made with respect to a specific embodiment, it can be seen that the present invention is not limited to that embodiment but may be adapted to a variety of applications as may become obvious to those skilled in the art. Since modifications to the foregoing may occur to those skilled in the art which very well may not constitute a departure from the scope and spirit of the invention, the description is intended to be merely exemplary and it is therefore contemplated that the appended claims will cover any such modification of embodiments as fall within the true scope of the invention.

What is claimed is:

1. A unitary mounting and coupling apparatus for joining a tool to an automaton comprising:
   a. a male connector having in cooperative combination at least one pin, a first plurality of electrical contacts, a first compressed air fitting and a mounting surface; and
   b. a cooperating female connector having at least one slot for receiving said pin, a second plurality of electrical contacts for connection with said first plurality of contacts, a second compressed air fitting for connection to said first compressed air fitting, and a mounting surface; wherein said apparatus is adapted to select and mount said tool, and couple electric and air power to said tool in a single connect operation, under control of said automaton, the choice of said power connections a function of the tool selected, in conjunction with said apparatus.

2. A coupling apparatus as in claim 1, said automaton having a moveable arm, wherein said mounting surface of said cooperating female member is rigidly attached to said arm.

3. A coupling apparatus as in claim 1, said automaton having a movable arm, wherein said mounting surface of said male connector is rigidly attached to said arm.

4. A coupling apparatus as in claim 2, further comprising a plurality of male connectors, each connector attached to one of a plurality of tools.

5. A coupling apparatus as in claim 4 wherein said plurality of male connectors are each positioned at a known position relative to said automaton wherein said automaton, in response to programming instructions, locates said known position and is capable of attaching and detaching a male connector and the attached tool.

6. A tool mounting system for an automaton comprising:
   a. means for rigidly mounting a tool on said automaton;
   b. means for electrically connection said tool to said automaton in cooperation with said rigid mounting means; and
   c. means for forming a continuous air conduit intermediate said tool and said automaton wherein said means for rigid mounting, said means for electrical interconnection, and said means for forming an air conduit cooperatively associated in a single mounting structure wherein said tool mounting system is adapted to select and mount said tool, and couple electric and air power to said tool in a single connect operation, under control of said automaton, the choice of said power connections a function of the tool selected, in conjunction with said apparatus.

7. A tool mounting system as in claim 6 said automaton having a moveable arm, said arm rigidly attached to a first portion of said single mounting structure.

8. A tool mounting system as in claim 6 further comprising a tool rigidly attached to a second portion of a single mounting structure, said first portion and second portion capable of cooperative engagement.

9. A tool mounting system as in claim 8 further comprising a plurality of second portions of said single mounting structure, each of said second portions attached to one of a plurality of tools.

10. A tool mounting system as in claim 9 wherein said plurality of second portions of said single mounting structure in conjunction with said attached tools are each positioned at a known position relative to said automaton wherein said automaton, in response to programming instructions, locates said known position and is capable of engaging and disengaging a second portion and the corresponding attached tool.

11. A bayonet coupling apparatus for joining a plurality of tools, one at a time, to an automaton comprising:
   a. an electrical connection in said coupling between said automaton and a mounted one of said tools;
   b. an air supply connection in said coupling between said automaton and a mounted one of said tools; and
   c. means for selection, mounting and dismounting one of said tools to said automaton wherein said bayonet coupling additionally operates to contemporaneously connect when mounting and contemporaneously disconnect when dismounting, said air supply connection and said electrical connection, in a single operation, and under control of said automaton; the choice of said power connections a function of the tool selected, in conjunction with said apparatus.

12. A bayonet coupling apparatus as in claim 11 having a cooperative male and female member wherein said male member is rigidly attached to said automaton.

13. A bayonet coupling apparatus as in claim 11 having a cooperating male and female member wherein said female member is rigidly attached to said automaton.

14. A bayonet coupling apparatus as in claim 13 further comprising a plurality of cooperating male members each rigidly attached to one of a plurality of tools.

15. A bayonet coupling apparatus as in claim 14 wherein said plurality of male members and their respective tools are each positioned at a known position relative to said automaton wherein said automaton, in response to programming instructions, locates said known position and is capable of connecting and disconnecting a male member and the corresponding attached tool.

* * * * *